United States Patent
Otto et al.

(10) Patent No.: US 6,296,036 B1
(45) Date of Patent: Oct. 2, 2001

(54) AUTO-SHUTTER SYSTEM FOR EYE PROTECTION AGAINST IN-BAND FREQUENCY AGILE LASERS

(75) Inventors: William F. Otto, Huntsville; Vernon H. Ayre, Falkville; John K. Dempsey, Union Grove; Richard D. Milton, Lacey Spring, all of AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 07/253,102

(22) Filed: Sep. 26, 1988

(51) Int. Cl.$^7$ ....................................................... B64C 1/14
(52) U.S. Cl. ................. 160/5; 49/31; 244/129.3; 244/12.1
(58) Field of Search ................. 160/5; 49/31; 244/129.3, 244/121; 89/1.11

(56) References Cited

U.S. PATENT DOCUMENTS

| | | | |
|---|---|---|---|
| 3,249,148 | * | 5/1966 | Zablodil et al. ..................... 160/5 X |
| 3,675,023 | * | 7/1972 | Kunke et al. ......................... 160/5 X |
| 3,691,686 | * | 9/1972 | Donegan ........................ 244/129.3 X |
| 3,860,055 | * | 1/1975 | Wild ..................................... 160/5 X |
| 4,637,447 | * | 1/1987 | Frank et al. ..................... 244/121 X |
| 4,644,990 | * | 2/1987 | Webb, Sr. et al. ......................... 160/5 |

* cited by examiner

*Primary Examiner*—Michael J. Carone
(74) *Attorney, Agent, or Firm*—Arthur H. Tisher; Freddie N. Bush

(57) ABSTRACT

An automatic-shutter system functions as a counter-measure to the in-band frequency agile laser threat posed to the eyes of pilot(s)/operator(s). Ideally it is desirable to protect the operator from every laser pulse including the first. However, the lack of fast shutters or optical gates (faster than a micro-second) suitable for visible usage has prevented the protection from a first pulse threat. The automatic-shutter system detects the first pulse and provides protection against any subsequent pulses. This is achieved by a multi-directional detector system for actuating shutters on the aircraft/vehicle. The detector, after detecting a pulse of laser light, further comprises processing means in electrical communication with the multi-directional detector for processing a detected pulse of laser light and to generate a signal responsive thereto. A plurality of shutters can be individually or group dropped in response to shutter actuating means to provide protection against subsequent pulses of laser light.

2 Claims, 1 Drawing Sheet

AUTO-SHUTTER SYSTEM FOR EYE PROTECTION AGAINST IN-BAND FREQUENCY AGILE LASERS

CROSS-REFERENCE TO RELATED APPLICATION

The Background of The Invention subject matter relates to our concurrently filed U.S. Patent applications titled: "Rotating Shutter System or Eye/Optics Protection Against In-Band Frequency Agile Lasers", Ser. No.:07/253100 Filed: Sep. 26, 1998, and "Rotating Shutter System for Hostile Laser Source Location Technique", Ser. No.:07/253099 Filed: Sep. 26, 1998

DEDICATORY CLAUSE

The invention described herein may be manufactured, used, and licensed by or for the Government for governmental purposes without the payment to us of any royalties thereon.

BACKGROUND OF THE INVENTION

Optical filters have been designed that attenuate sufficiently at a particular wavelength thus leaving the rest of the visible spectrum open. Since the use of filters greater than optical density-2 (OD-2) limits the performance of pilot/operator in bright sunlight conditions, it follows that the use of OD-2 filters in a low ambient light scenario would likewise limit the performance for non-instrumental surveillance at the latter conditions. Bright light in the visible region (e.g., wavelength from about 397 micrometers or microns to about 723 micrometers or microns) and to the infrared region to the limit of perception of human eye (which is about 100 microns or 100 micrometers), emitting from a point source relates to radiation of a different nature than that which is emitting from a wide spectrum electromagnetic radiation source extending in many directions. Radiation from a point source such as radiation from a frequency agile laser is the subject matter which is covered in greater detail hereinbelow.

Laser radiation particularly in the visible region has always presented a potential hazard to the human eye. More recently this potential has been under exploitation by military organizations both foreign and domestic. The human eye focuses light in the visible region which greatly increases the intensity of light on the retina from that striking the cornea and the lens.

Certain laser beams are 10,000 times brighter than the sun's rays, and much more hazardous. When a beam of laser radiation is absorbed by living tissue, the extent of damage caused is dependent on several things: the energy level of the radiation, the type of tissue irradiated, and the wavelength of the laser radiation, and the time of exposure to the radiation.

Intense laser-energy when absorbed by the body is converted into heat. This heat coagulates the protein in the body's tissues (in a similar manner when boiling water coagulates egg albumin) and destroys the cells.

The human eye is the most vulnerable tissue to all types of laser radiation. The tissue in the retina (that portion of the eye upon which the light or image is focused, and specifically the fovea of the retina) is particularly susceptible to damage because the lens of the eyeball concentrates and focuses the laser beam on the fovea of the retina.

The interaction of a laser beam with eyeball tissue as received by the cornea and focused by the lens on the fovea of the retina is described as follows:

1. As the laser beam impinges on the eyeball, part of the beam is prevented from entering the eye by the iris, a colored disc behind the cornea (the outwardly convex transparent membrane forming part of the anterior outer coat of the eye); the iris acts like an automatic photographic shutter and constricts when high-intensity light impinges on the eye;

2. The shutter action of the iris prevents part of the light from reaching the retina;

3. The part of light which reaches the retina also affects a thin, dark-brown choroid membrane containing arteries, veins, and pigment cells which surrounds the retina. This membrane being dark colored can easily absorb this harmful radiation; hence, it must be protected;

4. The laser beam is converged and focused on the fovea of the retina by the lens; and, 5. As projected from laser-welding principles we know that the focus is the hottest point, therefore, the laser-energy density at the fovea (which is the focal point) is about $10^4$ to $10^6$ times more concentrated than that received by the cornea and the lens.

As concluded from the above described interactions, it is recognized why eye damage can occur due to this magnitude of light concentration.

Since the laser when used as a weapon against the human eye, eyes behind optics, and optics themselves is considered a threat to U.S. Forces, scientists have looked hard at contermeasure techniques. Protective goggles or glasses have been the only real product of research efforts. The bulk of the work has been in the types of filters to go in this eyewear.

Filters have been designed that attenuate sufficiently at a particular wavelength thus leaving the rest of the visible spectrum open. This is a real advantage to the pilots or operators in performing their tasks. With the advent of frequency agile lasers however, it has become necessary to filter over the entire visible region. This presents a real handicap to the operators in performing their tasks particularly in a low ambient light scenario.

The use of an optical gate or shutter to block out the entire visible region has been considered. The problem with this conceptive idea is that there is just not enough time to detect radiation and actuate a gate or shutter before damage is done by a first laser pulse. The gate or shutter could be dropped over the eyes of the pilot or over a particular part of the cockpit itself. The latter type of protection is attractive for use as a shield from the intense flash in a nuclear explosion since it employs the electro-magnetic pulse as a source for detection far enough in advance of the flash of a nuclear explosion so that time permits the dropping of a shield in advance of the arrival of the flash radiation. In the case of a laser pulse there is not sufficient time to detect a first laser pulse and actuate a shutter/gate before damage is done to the eye.

An object of this invention is to take advantage of this shutter/gate idea by employing radiation detecting devices for accepting the first pulse, processing it, and initiating activating procedures which protect against subsequent pulses. The probabilities here are in favor of the operator since the chance that the operator will not be looking directly at the source of the laser upon the first pulse or that the pulse will be off target (assuming operator to be target) but is still detectable. The described protection for a second pulse based on the probability that the greatest danger may be that a operator will instinctively look towards the source when the second pulse arrives. The plan of action is to prevent this instructive look toward the radiation source from taking place by detecting the first pulse and then triggering the shutter to protect against subsequent pulses.

Therefore, a further object of this invention is to provide a detection device for a first laser pulse which is subsequently processed and employed in combination with a shutter triggering control for dropping a protective shutter against agile laser radiation.

SUMMARY OF THE INVENTION

An auto-shutter system for eye protection against in-band frequency agile lasers comprises a multi-directional detector capable of detecting a first pulse of laser light from a hostile beam which is subsequently processed to yield a signal. The resulting signal is transmitted to a shutter control. The shutter control determines from which direction the first pulse arrived and whether or not the signal is of a predetermined threshold level. If it is determined that the signal is over a predetermined threshold level (e.g., level of laser radiation pulse which would be damaging to eyes), the shutter control actuates or drops the particular shutter(s) on the aircraft that will provide protection against subsequent pulses.

DESCRIPTION OF THE PREFERRED EMBODIMENT

Figure 1:
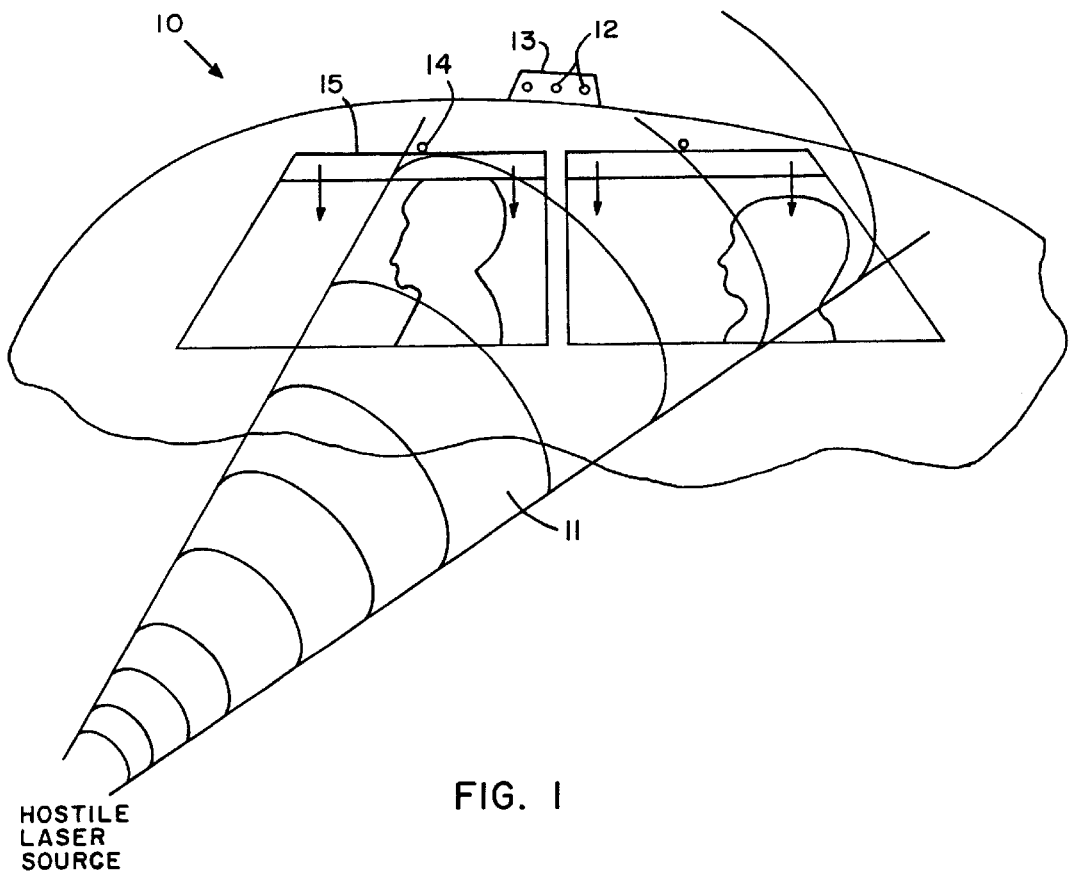
FIG. 1 depicts a diagramatic view 10 of the invention comprising multi-directional laser beam detectors in combination with shutter actuator control and shutters for shielding against a hostile laser beam.

The environment of use for the embodiment of the invention includes pilot/operator in an aircraft in an attack run of a target. It may or may not be apparent that a flash in the peripheral vision of a pilot/operator may be a hostile laser beam. By instinct, the pilot/operator may want to turn to look in the direction of the flash. However, before the time required to complete the described, instinctively motivated action has transpired, the auto-shutter system for protection against a second flash is actuated following detection of the first laser beam flash, and the detected first flash is transmitted in the form of a signal to a shutter control as further described below. But, first a description of sensors or detectors well known to those skilled in the art will be broadly described.

Infrared (IR) sensors which are employed for IR detection through the atmosphere are designed for certain windows (i.e., regions of IR spectrum where transmission of certain wavelengths are relatively transparent due to the lack of molecular absorption bands from such species as $H_2O$ and $Co_2$). These windows are defined as short wavelength infrared radiation (SWIR), middle wavelength (MWIR), and long wavelength (LWIR), regions at 1–2, 3–5, and 8–14 microns, respectively.

It is well known that a unique feature of IR radiation is its emission by all objects above absolute zero. Thus it is possible to "see" an object by directly detecting its IR emission, rather than by detecting reflected radiation from an illuminating source. Examples wherein objects are observed by employing an illuminating source are described hereinbelow.

Objects are observed by detecting reflected light in the visible region. Objects are observed in the microwave region by detecting reflected radiation from a radar transmitter used to illuminate the objects. As noted above, in the infrared, the source of the radiation is the object itself, and thus, the detection can be one-way and entirely passive. If desired, however, an IR laser illuminator can also be used to enhance performance or to obtain additional Doppler information.

Detectors employing LWIR are preferred for detection of near ambient temperature targets such as ground vehicles. Detectors employing MWIR are preferred for detection of elevated temperature targets such as a hot plume or a jet exhaust. In addition, there are certain molecular emission bands in the MWIR that are characteristic of hot exhaust gases which can be used to enhance detection. Examples of two such missile detection systems for operation in certain IR wavelengths include an air-to-air "heat seeker" missile, which operates in the MWIR, and an air-to-ground missile, which operates in the LWIR. The latter missile employs a 16 element HgCdTe detector array. A further discussion of HgCdTe detector and variations thereof are set forth hereinbelow.

The heart of any IR detection system is the IR sensor, and one of the most versatile semiconductor detector materials is $Hg1_{-x} Cd_x Te$, often abbreviated as HgCdTe or mercury-cadmium telluride (MCT). By varying the Cd/Hg ratio, indicated by the x value, the direct bandgap of this ternary compound can be varied from 1.6 eV for CdTe to –0.3 eV for HgTe. The two most popular compositions are HgCdTe (x–0.2) which has a smaller bandgap of approximately 0.10 eV at 77 K resulting in a peak response in the LWIR region. Note that the bandgap, which is a function of both composition and temperature is referenced at 77 K. This is because all photon detectors operating at these wavelengths must be cooled to cryogenic temperatures to reduce thermal excitation processes and thus enhance performance.

HgCdTe, due to its intrinsic nature, can be operated at the highest cryogenic temperature of any common semiconductor material operating in the MWIR or LWIR spectral bands. For example, HgCdTe is typically operated at 77 K in the LWIR region, whereas for extrinsic silicon (Ga-doped Si), another common detector material, the operating temperature must be near 20 K. In the MWIR, HgCdTe which is again typically operated at 77 K can be used as high as 200 K, a temperature achievable with thermoelectric coolers rather than requiring Joule-Thomsom (J-T) cryostats or closed cycle refrigerators. For other detector materials used in this region such as InSb or PtSi, the operating temperature is usually less than 100 K.

Figure 2:
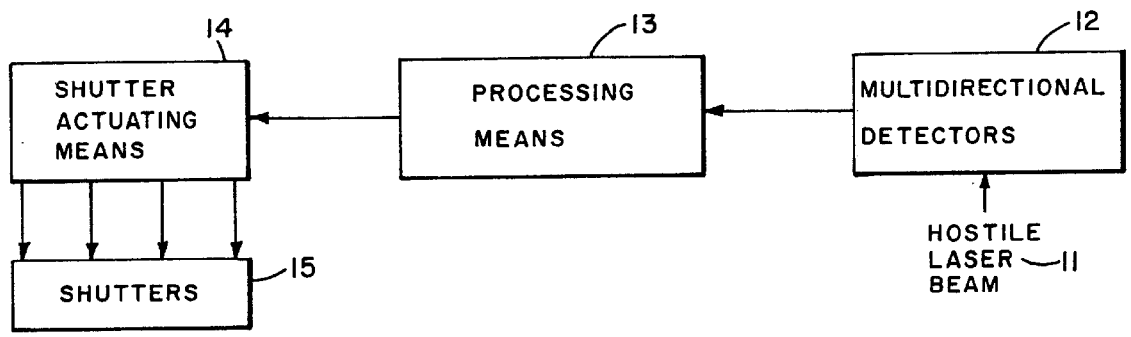
FIG. 2 depicts a block diagram of a preferred embodiment of the automatic-shutter system employing the described elements depicted in diagramatic view 10 of FIG. 1.

In further reference to FIGS. 1 and 2, a first pulse of laser light from the hostile beam 11 is transmitted from its source to strike the multi-directional detectors 12. Typically, detectors 12 may be a plurality of linear or quadrant detector arrays disposed to face on either side and in front of the canopy to respond to impinging energy in the field of interest. Output electrical signals from any detector 12 impinged upon and coupled to signal processing means 13 for subsequently driving the shutter actuating means. Typically, the signal processing means may be a comparator circuit having a reference or bias level that must be exceeded by the detected signal. The comparater compares the signal from the detector array with a set voltage. This set voltage corresponds to a signal level that would be received from the detector array when irradiated by a laser pulse of sufficient fluence to cause damage to the human eye. This damage level, with a safety margin included, is given as the Maximum Permissable Exposure (MPE) in the various laser safety handbooks. The MPE varies with laser pulse width, wavelength, and exposure time. The eye is most sensitive to the visible wavelengths thus the MPE's are lower and are the driving factors in setting the comparator set level. The most restrictive MPE (i.e. for shortest pulse widths) for the visible wavelengths is $5\times10^{-7}$ J/cm$^2$. Typically, a signal from the detector array corresponding to a radiation level that exceeds this value causes the comparator to output a voltage to the shutter actuating means 14 to close the shutter.

After the above described sequences of events have resulted in a shutter activation, this shutter will remain closed until the detectors indicated an all clear or until the pilot manually overrides. If the pilot has information from the detectors about the radiation level and he recognizes that the protection level accorded by his goggles are adequate, then he can put the goggles on and deactuate the shutters. He then could locate the source (as a prelude to neutralizing it) or continue his attack run. If the shutter(s) remain actuated (particularly the frontal) he must fly by his instruments until the threat no longer exists. He always has the option to turn his aircraft away from the source and then deactuate the shutter(s).

We claim:

1. An automatic-shutter system for eye protection for an operator of an aircraft against in-band frequency agile laser beam comprising:

(i) a multi-dirctional detector for detecting a first laser pulse of laser light;

(ii) processing means in electrical communication with said multi-directional detector for processing said detected first laser pulse of laser light and to generate an output signal responsive thereto, said processing means being a comparator circuit having a predetermined reference set voltage which corresponds to a threshold level which must be exceeded by said output signal of said multi-directional detector before said comparator circuit is activated, said threshold level corresponding to a signal level that would be received from said multi-directional detector after said multi-directional detector detects said first laser pulse of sufficient fluence to cause damage level to a human eye, said damage level being further defined as the maximum permissible exposure (MPE) in according with laser safety standards;

(iii) shutter actuating means responsive to the output of said processing means for actuating or dropping the particular shutter(s) on the aircraft that will provide protection against subsequent pulses of laser light; and, (iv) a plurality of shutters which can be actuated or dropped in response to said shutter actuating means.

2. The automatic-shutter system for eye protection for an operator of an aircraft against in-band frequency agile laser beam as defined in claim 1 wherein said first pulse of laser light detected by said multi-directional detector and said signal processed from said detected first pulse of laser light is equivalent to a predetermined threshold level of laser rediation which corresponds to the most restrictive maximum permissible exposure for shortest pulse width for the visible wavelength of $5\times10^{31}$ $^7$ J/cm$^2$, and wherein said shutter actuating means drops one or more shutters to provide protection against subsequent pulses of laser light.

* * * * *